Patented June 3, 1941

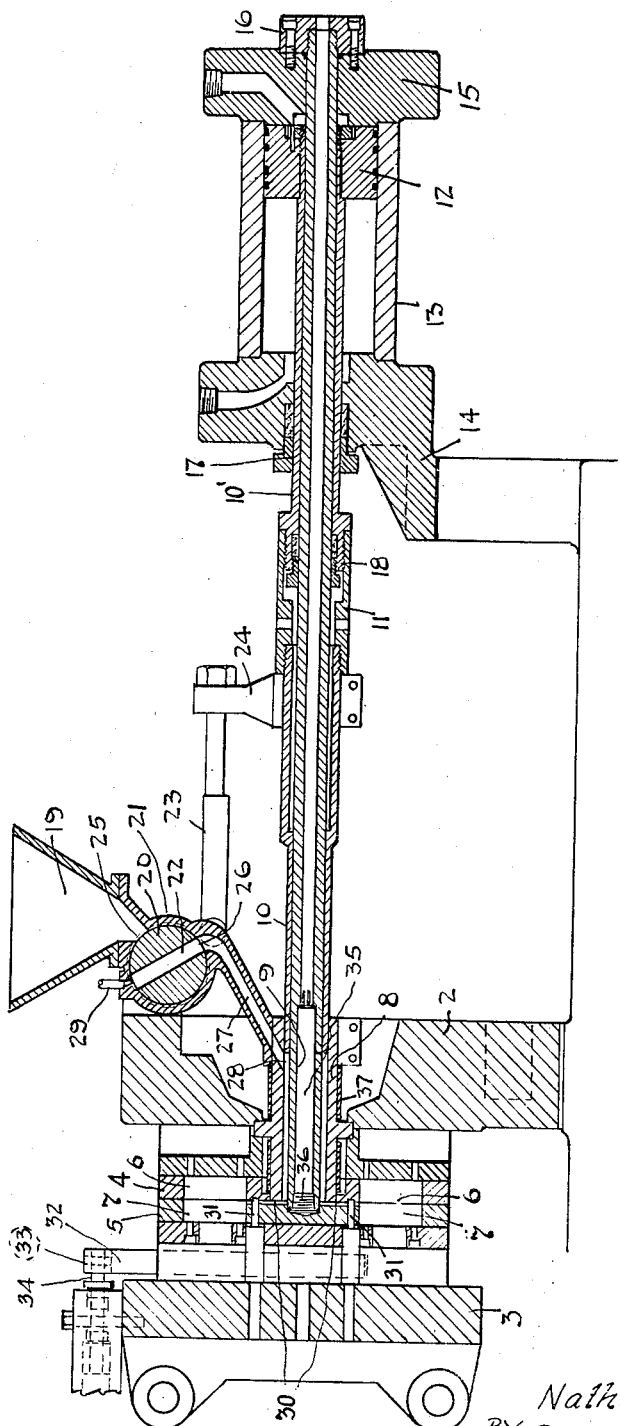

2,243,968

UNITED STATES PATENT OFFICE 2,243,968

PLASTIC CASTING MACHINE

Nathan Lester, Cleveland Heights, Ohio, assignor to Lester Engineering Company, Cleveland, Ohio, a corporation of Ohio Application April 15, 1938, Serial No. 202,301

2 Claims. (Cl. 18—30)

The present invention relates to a machine for casting materials under pressure into a permanent mold or die. In the plastic molding art, such a machine is known as the "injection molding type." Before the material to be cast is introduced under pressure into the mold or die cavity, it must be changed from its original powdered, granulated, or finely divided solid form into a softened or plastic mass by the application of heat. In the casting or molding of both thermoplastic and thermosetting materials, the control and uniformity of the application of heat before entry of the material into the mold, as well as the control of the pressure applied to the material at such time, are important factors in the production of high grade and satisfactory castings.

The general object and nature of my invention is to provide a plastic casting machine wherein the material is completely evacuated from the pressure casting cylinder upon each casting operation, and at the same time reduced to a relatively thin cross-sectional thickness and heated upon both the inner and outer surfaces of its cross-section; and wherein the material is positively retained or enclosed in the pressure casting cylinder during such initial application of heat and pressure so that the likelihood of premature leakage of a portion of the plasticized material into the die cavity is prevented.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing the single figure is a vertical sectional view illustrating the construction of a machine embodying the principle of my invention.

Such machine comprises a supporting base, a portion of which is indicated at 1, mounting the vertically extending stationary die plate 2 and the movable die plate 3. The mechanism for movably mounting the movable die plate 3 upon the base 1 need not be further illustrated or described, since such mechanism is well known to those skilled in the art.

Die blocks 4 and 5 mounted upon the die plates 2 and 3 respectively meet at the parting line 6 to form the die cavity 7.

A pressure casting cylinder 8 is fixedly mounted in the stationary die plate 2. A second, hollow cylinder 9 is mounted within the casting cylinder 8 and its outer diameter is less than the inner diameter of the cylinder 8 so that there is a space between the walls of these two cylinders. This space is adapted to be occupied by the reciprocable annular ram or plunger 10 whose extending portion 10' constitutes a piston rod upon which the hydraulic piston 12 is mounted. The plunger 10 and its portion 10' are connected by means of the threaded coupling 11.

The piston 12 operates in the hydraulic cylinder 13 which is stationarily mounted by means of the bracket 14 upon the base 1. The right hand end of the cylinder 9 extends beyond the head end of the piston 12 and is fixedly supported in the head 15 of the cylinder 13 by means of the flange 16.

A packing gland or stuffing box 17 seals the annular plunger portion 10' with respect to the rod end of the hydraulic cylinder 13. Another packing gland or stuffing box 18 seals the annular plunger portion 10' with respect to the fixed cylinder 9. In this manner, the possibility of any leakage of the hydraulic fluid from the cylinder 13 along the surfaces of the annular plunger portion 10' and of the fixed cylinder 9, as the former reciprocates, is prevented.

A material feed hopper 19 is mounted on the stationary die plate 2. A rotatable measuring cylinder 20 is mounted in the cylindrical housing 21 immediately below the hopper 19. The measuring cylinder 20 has a diametrically extending measuring cavity 22. A connecting rod 23 is eccentrically connected to the rotatable cylinder 20 at one end and connected at the other end by means of the bracket 24 to the annular plunger 10. Reciprocation of the plunger 10 is thus adapted to move the rotatable cylinder 20 from an angular position of rotation wherein the upper, open end of the measuring cavity 22 is in registry with the bottom opening 25 of the hopper 19, to the alternate position where its lower open end of the cavity 22 is in registry with the entrance end 26 of the material feed passage 27. The latter position of the rotatable cylinder 20 is shown in the drawing. The lower or discharge end 28 of the feed passage 27 communicates with the space between the casting cylinder 8 and the fixed inner cylinder 9 at a point adjacent the end of the annular plunger 10 when the latter is fully retracted or ready to begin its working stroke.

A compressed air conduit 29 is located in the cylindrical housing 21 at a point adjacent the upper open end of the measuring cavity 22 when the latter is in material feeding position as indicated in the drawing. The introduction of compressed air through the conduit 29 aids the force of gravity in completely evacuating the powdered, granulated, or finely divided material from the cavity 22, through the passage 27, to the pressure casting cylinder 8.

The left hand or discharge end of the pressure casting cylinder 8 communicates with the passages 30 leading to the die cavity 7. Longitudinally slidable bars 31 are mounted in the die block 5 and extend transversely through the passages 30. The bars 31 are of greater width than that of passages 30, and hence are adapted to completely obstruct and shut off the latter. The bars 31 are connected through rack and gear mechanism (not shown) to the rock shaft 32. A lever arm 33 on the upper end of the rock shaft 32 is connected to the horizontally movable bar 34. The latter is operated either manually or mechanically, such as by connection to a hydraulic cylinder, to rotate the shaft 32 and thus move the bars 31 in and out to open and close passages 30.

A heating element 35 is located within the hollow cylinder 9. A threaded plug 36 closes the left hand end of the hollow cylinder 9 and aids in retaining the heating element 35 therein. A second heating element 37 is mounted upon the outer wall of the cylinder 8. The necessary electrical or fluid conduits (such as steam line tubing) for supplying heat energy to the heating element 35 are of course carried through the right hand portion of the hollow fixed cylinder 9 to the exterior of the machine.

The operation of the above described mechanism is as follows: Assuming that the measuring cavity 22 has received a charge of material from the hopper 19, such material is then transferred through the feed passage 27 to the space between the cylinders 8 and 9. The material is then subjected to heat from both the inner wall of the cylinder 8 and the outer wall of the cylinder 9. The plasticization of the material is effected by such heating and further aided by the application of pressure through the partial movement of the annular plunger 10 in a lefthand direction. Such partial movement of the plunger 10 will not force any of the material out of the pressure casting cylinder 8 and into the die cavity 7, since the discharge passages 30 are closed by the bars 31. After the proper and desired plasticization of the material in the cylinder 8, the passages 30 are opened by withdrawal of the bars 31 and the annular plunger 10 is further moved in a left hand direction to completely evacuate the material into the die cavity 7. The length of time, the temperature and the initial application of pressure upon the material in the casting cylinder 8 are determined of course by the particular type of material to be cast.

After the plasticized material is injected under pressure in the die cavity 7 and has become solidified therein either by a chilling action, as is the case in the use of thermoplastic materials, or by heating or curing action as is the case in thermosetting materials, the movable die plate 3 is moved to open position in the casting ejected in the customary manner. In the meantime, since the annular plunger 10 has been moved to the end of its working stroke, or to the full extent of its travel in a left hand direction with respect to the drawing, the rotatable cylinder 20 has accordingly been moved to a position where the upper open end of the measuring cavity 22 is placed in communication with the discharge opening 25 of the hopper 19 so that the cavity 22 thereby becomes filled with a measured amount of the material. The plunger 10 is then moved upon its return stroke to the position shown in the drawing where the parts of the machine are ready to repeat the cycle of operation.

It will thus be seen that my above described invention provides means for uniformly and efficiently heating the entire mass of the material to be cast upon each cycle of operation, and that such material is completely evacuated from the heating and casting cylinder so that no portion of such material remains to be subjected to a greater amount of heat treatment than any other portion, thus insuring a resultant casting of uniform consistency and properties.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a pressure casting machine, the combination of a pressure casting cylinder, a fixed cylinder mounted within said pressure casting cylinder and having its outer wall spaced from the inner wall of said pressure casting cylinder, an annular plunger reciprocable in and adapted to completely occupy such space between said cylinders, a hydraulic piston connected to said annular plunger, a fixedly supported hydraulic cylinder for said piston, said hydraulic cylinder being spaced and separate from said casting cylinder, said fixed cylinder extending beyond said piston and being mounted in the head end of said hydraulic cylinder.

2. In a pressure casting machine, the combination of a pressure casting cylinder, a fixed cylinder mounted within said pressure casting cylinder and having its outer wall spaced from the inner wall of said pressure casting cylinder, an annular plunger reciprocable in and adapted to completely occupy such space between said cylinders, said fixed cylinder extending beyond the end of said annular plunger, a fixed support connected to the extending end of said fixed cylinder, a hydraulic piston connected to said annular plunger, a fixedly supported hydraulic cylinder for said piston, said hydraulic cylinder being spaced and separate from said casting cylinder, said fixed cylinder extending beyond said piston and being mounted in the head end of said hydraulic cylinder.

NATHAN LESTER.